United States Patent
Medeiros Pacheco De Andrade et al.

(10) Patent No.: US 11,708,297 B2
(45) Date of Patent: Jul. 25, 2023

(54) PARTICLE MIXTURE

(71) Applicant: Fenzi AGT Netherlands B.V., Maastricht (NL)

(72) Inventors: Miria Medeiros Pacheco De Andrade, Aachen (DE); Edwin Peter Kennedy Currie, Maastricht (NL); Syarif Riyadi, Maastricht (NL); Patricia Ann Sutton, Reading Berkshire (GB)

(73) Assignee: Fenzi AGT Netherlands B.V., Maastricht (NL)

( * ) Notice: Subject to any disclaimer, the term of this patent is extended or adjusted under 35 U.S.C. 154(b) by 525 days.

(21) Appl. No.: 16/635,040

(22) PCT Filed: Jul. 16, 2018

(86) PCT No.: PCT/GB2018/052011
§ 371 (c)(1),
(2) Date: Jan. 29, 2020

(87) PCT Pub. No.: WO2019/030469
PCT Pub. Date: Feb. 14, 2019

(65) Prior Publication Data
US 2020/0247713 A1    Aug. 6, 2020

(30) Foreign Application Priority Data

Aug. 9, 2017   (GB) ...................... 1712762

(51) Int. Cl.
*C03C 8/14*    (2006.01)
*C03C 3/115*   (2006.01)
(Continued)

(52) U.S. Cl.
CPC ................. *C03C 8/14* (2013.01); *C03C 1/04* (2013.01); *C03C 3/115* (2013.01); *C03C 4/02* (2013.01);
(Continued)

(58) Field of Classification Search
CPC .... C03C 8/14; C03C 1/04; C03C 8/06; C03C 8/12; C03C 8/04
See application file for complete search history.

(56) References Cited

U.S. PATENT DOCUMENTS

| 4,822,396 A | 4/1989 | Reinherz et al. |
| 5,153,150 A | 10/1992 | Clifford et al. |
(Continued)

FOREIGN PATENT DOCUMENTS

| CN | 103534218 A | 1/2014 |
| EP | 2 817 268 B1 | 12/2016 |
(Continued)

OTHER PUBLICATIONS

International Search Report of the International Searching Authority for PCT/GB2018/052011 dated Nov. 6, 2018.
(Continued)

*Primary Examiner* — Karl E Group
*Assistant Examiner* — Cameron K Miller
(74) *Attorney, Agent, or Firm* — BakerHostetler

(57) ABSTRACT

The present invention relates to a particle mixture comprising particles of glass frit and particles of a crystalline oxide material, wherein the glass frit comprises silicon oxide ($SiO_2$), zinc oxide (ZnO) and sulfur (S) and wherein the D90 particle size of the particle mixture is less than 5 microns. The particle mixture may be used to apply an enamel to a substrate. The present invention further relates to the use of the particle mixture to form an enamel on a substrate, to a glass sheet and to an automotive window pane.

32 Claims, 9 Drawing Sheets

(51) Int. Cl.
*C03C 8/06* (2006.01)
*C03C 8/12* (2006.01)
*C03C 1/04* (2006.01)
*C03C 4/02* (2006.01)
*C03C 17/04* (2006.01)
*C03C 17/00* (2006.01)
*C03C 8/04* (2006.01)

(52) U.S. Cl.
CPC .................. *C03C 8/06* (2013.01); *C03C 8/12* (2013.01); *C03C 17/007* (2013.01); *C03C 17/04* (2013.01); *C03C 8/04* (2013.01); *C03C 2204/00* (2013.01); *C03C 2207/00* (2013.01)

(56) References Cited

U.S. PATENT DOCUMENTS

| | | |
|---|---|---|
| 5,250,475 A | 10/1993 | Zybell et al. |
| 6,346,493 B1 | 2/2002 | Kniajer et al. |
| 2007/0054793 A1 | 3/2007 | Sakoske et al. |
| 2007/0234759 A1 | 10/2007 | Sakoske et al. |
| 2008/0063876 A1 | 3/2008 | Sakoske et al. |
| 2010/0009837 A1 | 1/2010 | Sakoske |
| 2011/0277505 A1 | 11/2011 | Sakoske |
| 2012/0282407 A1* | 11/2012 | Singh ................ C03C 8/14 501/19 |
| 2015/0013390 A1 | 1/2015 | Singh et al. |

FOREIGN PATENT DOCUMENTS

| | | |
|---|---|---|
| JP | H05105482 A | 4/1993 |
| JP | H09067139 | 11/1997 |
| JP | 2011527662 A | 11/2011 |
| WO | 2007/024375 A2 | 3/2007 |
| WO | 2007/032977 A1 | 3/2007 |
| WO | 2010/005629 A1 | 1/2010 |
| WO | 2010005629 A1 | 1/2010 |
| WO | 2015/071670 A | 5/2015 |
| WO | 2016122833 A | 8/2016 |

OTHER PUBLICATIONS

Search Report for Patent Application No. GB1712762.2 dated Jan. 22, 2018.

* cited by examiner

# PARTICLE MIXTURE

FIELD OF THE INVENTION

The present invention relates in particular to a particle mixture suitable for applying an enamel to a substrate. The particle mixture may be employed in an ink suitable for use in a method of forming an enamel on a substrate.

BACKGROUND OF THE INVENTION

Enamels are widely used to decorate or produce coatings on glass and ceramic substrates, such as tableware, signage, tiles, architectural glass etc. Enamels are especially useful in forming coloured borders around glass sheets used for automotive windshields, side windows (sidelites) and rear windows (backlites). The coloured borders enhance appearance as well as preventing degradation of underlying adhesives by UV radiation. Moreover, the coloured borders may conceal buss bars and wiring connections of glass defrosting systems.

Enamels typically comprise pigment and glass frit. In general, they are applied to a substrate (e.g. a windshield surface) as an ink, e.g. by screen printing. The ink may comprise particles of pigment and glass frit dispersed in a liquid dispersion medium. After application of a coating of ink to the substrate, the ink is typically dried and the applied coating undergoes firing, i.e. is subjected to heat treatment to cause the frit to melt and fuse to the substrate; thereby adhering an enamel to the substrate. During firing, the pigment itself typically does not melt, but is affixed to the substrate by or with the frit.

Glass sheets for automotive use often undergo a pressure forming process to bend the glass into the desired final shape. Typically, such glass sheets are coated in the desired region with an ink via screen printing prior to being subjected to a pressure forming process at elevated temperatures. The elevated temperature employed during this process causes the coating to undergo firing whilst softening the glass sheet, which can then be formed into a desired final shape using a forming die or mould. However, a problem encountered during such pressure forming processes is that the enamel may adhere ("stick") to the die or mould employed.

Pressure forming is also used, for example, in the production of glass bottles, architectural glass and appliance glass. In these examples, it may also be desirable to apply an enamel for decorative and/or functional reasons.

Various approaches have been suggested to facilitate the pressure forming of glass with enamel compositions applied thereon in order to avoid the enamel adhering to the die or mould. One approach involves the use of crystallisable glass frits including precursors of a compound which can be crystallised upon firing, for example precursors of $Zn_2SiO_4$. Such crystallisable frits may be used in combination with a crystalline seed additive which promotes crystallisation of at least a portion of the precursors present in the frit during firing. Such a seed additive may, for example, comprise crystalline $Zn_2SiO_4$.

Further, obscuration enamels for automotive use typically have a thickness in the range 10 to 15 microns—this provides sufficient opacity to adequately block transmission of sunlight, such that degradation of underlying adhesives by exposure to UV radiation is prevented. It is known that the risk of glass weakening may increase proportionally to the thickness of an applied enamel. Thus, it would be desirable to provide an enamel of reduced thickness which still achieves the required opacity.

It has now been found that the use of a particle mixture comprising sulfur-containing zinc-silicate glass frit and a crystalline oxide material, wherein both the frit and the crystalline oxide material have a D90 particle size of less than 5 microns, may allow improved anti-stick performance and reduced enamel thickness to be achieved.

SUMMARY OF THE INVENTION

According to the present invention, there is provided a particle mixture for forming an enamel comprising particles of glass frit and particles of a crystalline oxide material, wherein the glass frit comprises silicon oxide ($SiO_2$), zinc oxide (ZnO) and sulfur (S) and wherein the D90 particle size of the particle mixture is less than 5 microns.

According to a second aspect of the present invention, there is provided an ink for forming an enamel comprising:
  a particle mixture comprising particles of glass frit and particles of a crystalline oxide material;
  a liquid dispersion medium;
wherein the glass frit comprises silicon oxide ($SiO_2$), zinc oxide (ZnO) and sulfur (S); and wherein the D90 particle size of the particle mixture is less than 5 microns.

According to a further aspect of the present invention there is provided a method of preparing an ink comprising mixing:
  a) particles of glass frit, which glass frit comprises silicon oxide ($SiO_2$), zinc oxide (ZnO) and sulfur (S);
  b) particles of a crystalline oxide material; and
  c) a liquid dispersion medium;
wherein each of components a) and b) have a D90 particle size of less than 5 microns.

According to yet a further aspect of the present invention, there is provided a method of forming an enamel on a substrate, the method comprising applying a coating of an ink as described above onto the substrate and firing the applied coating.

According to yet another aspect, there is provided a substrate having an enamel formed thereon, wherein the enamel is obtained or obtainable by the method described above.

According to yet another aspect, there is provided the use of a particle mixture or an ink as described above to form an enamel on a substrate.

According to yet another aspect, there is provided the use of a particle mixture or an ink as described above to form a coloured obscuration band around the periphery of a sheet of automotive glass, in particular a sheet of automotive glass which is subjected to a pressure-forming process.

According to yet another aspect, there is provided the use of a particle mixture or an ink as described above to form an enamel on appliance glass, for example, refrigerator glass, oven glass etc.

According to yet another aspect of the present invention, there is provided a glass sheet having an enamel formed on at least a portion of a surface of the sheet, wherein the enamel has an optical density of at least 2.5 and a thickness of less than or equal to 12 microns.

According to yet another aspect of the present invention there is provided a glass sheet having a curved section and having an enamel formed on at least a portion of a surface of the curved section of the sheet, wherein the enamel has an optical density of at least 2.5 and a thickness of less than or equal to 12 microns.

According to yet another aspect of the present invention, there is provided an automotive window pane comprising a glass sheet having a curved section and having an enamel formed on at least a portion of a surface of the curved section of the sheet, wherein the enamel has an optical density of at least 2.5 and a thickness of less than or equal to 12 microns.

According to yet another aspect of the present invention, there is provided a kit comprising particles of glass frit and particles of a crystalline oxide material, wherein the glass frit comprises silicon oxide ($SiO_2$), zinc oxide (ZnO) and sulfur (S) and wherein the D90 particle size of the glass frit is less than 5 microns and the D90 particle size of the crystalline oxide material is less than 5 microns.

DETAILED DESCRIPTION

Figure 1:
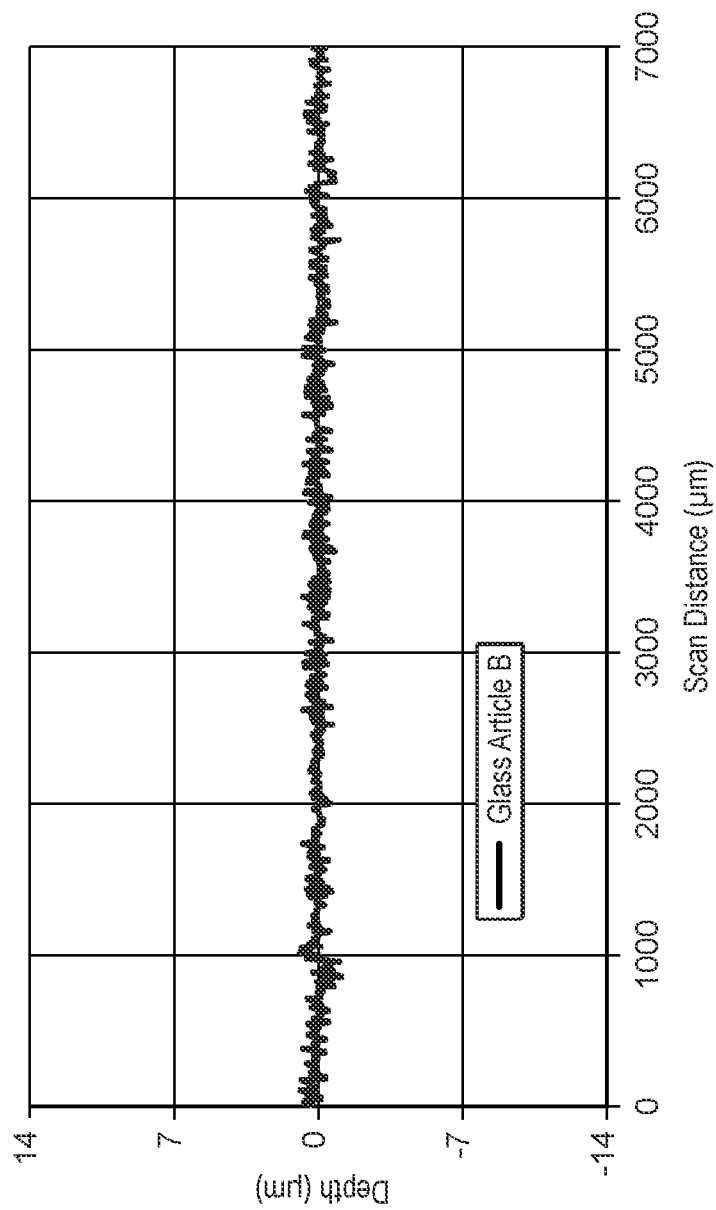
FIG. 1 shows a surface contour scan of an enamel formed on a glass article using a particle mixture according to the present invention.
Figure 2:
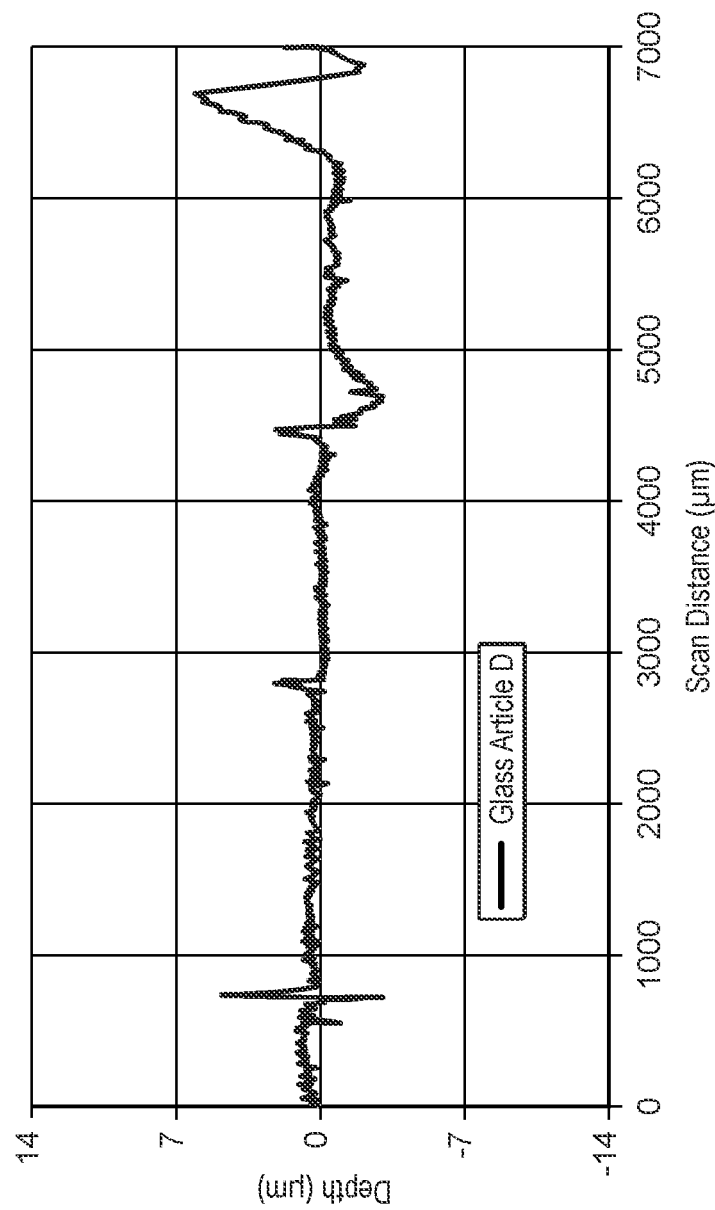
FIG. 2 shows a surface contour scan of an enamel formed on a glass article using a comparative particle mixture.
Figure 3:
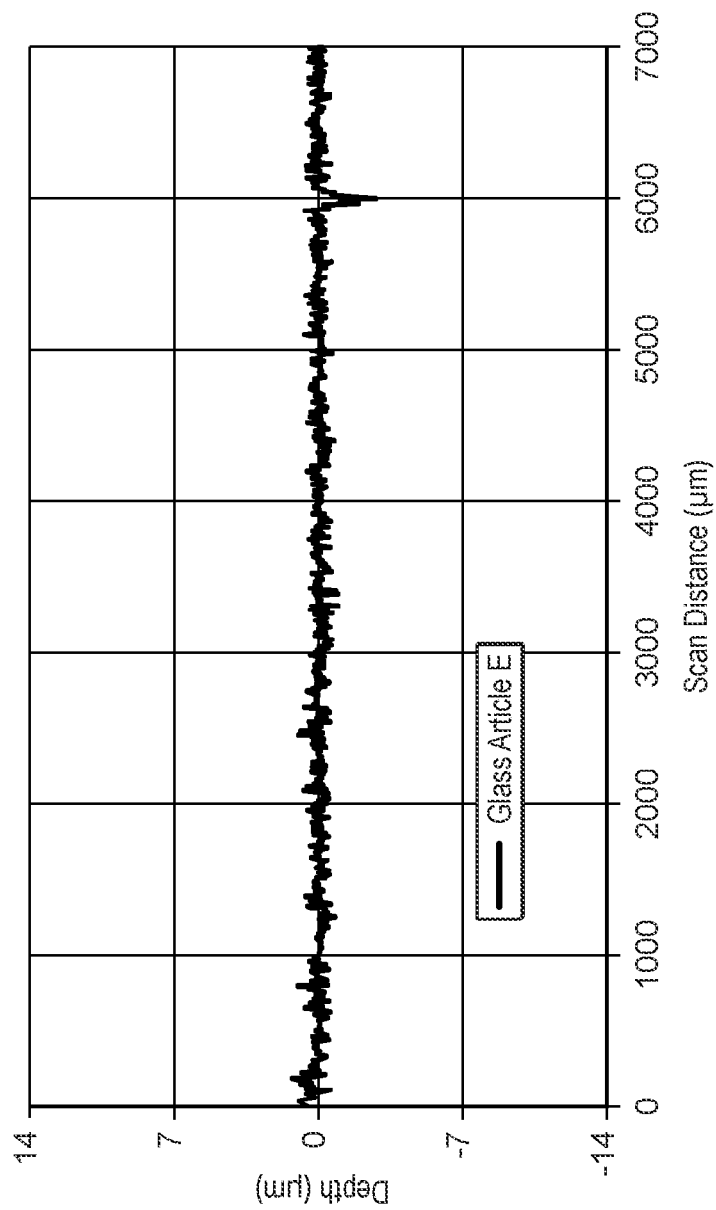
FIG. 3 shows a surface contour scan of an enamel formed on a glass article using a particle mixture according to the present invention.
Figure 4:
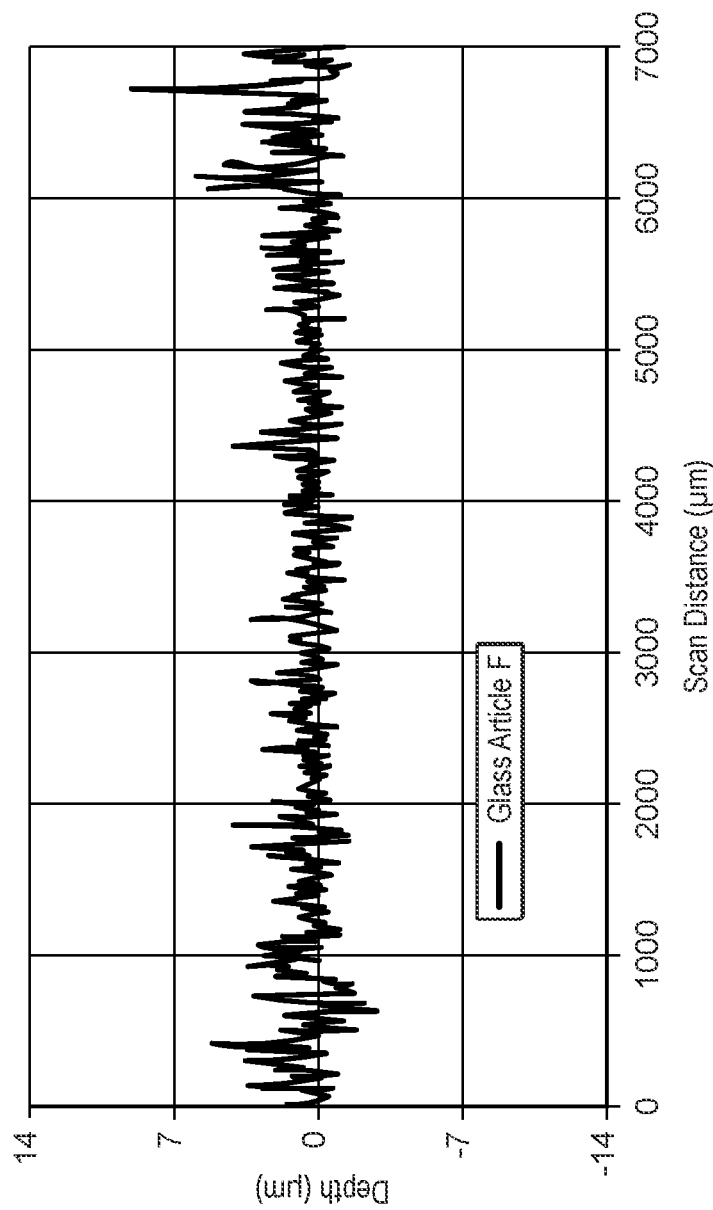
FIG. 4 shows a surface contour scan of an enamel formed on a glass article using a commercially available ink.
Figure 5:
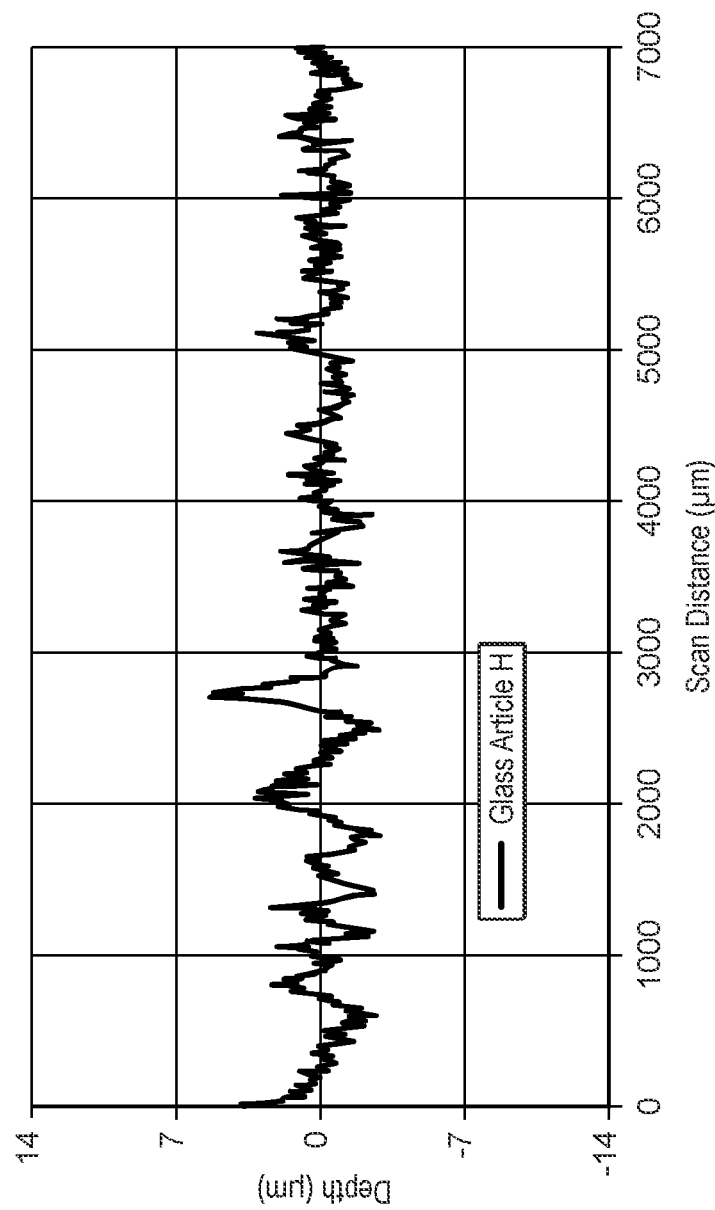
FIG. 5 shows a surface contour scan of an enamel formed on a glass article using a particle mixture according to the present invention.
Figure 6:
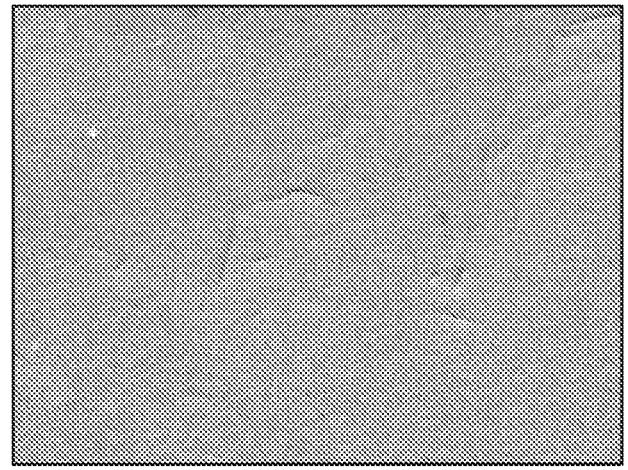
FIG. 6 shows an optical microscope image of an enamel formed on a glass article using a particle mixture according to the present invention.
Figure 7:
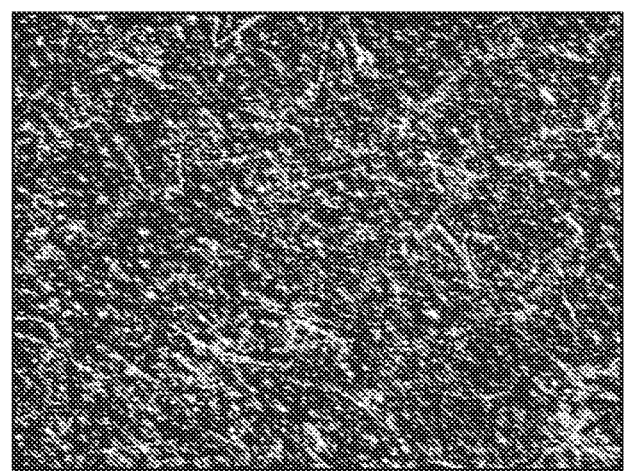
FIG. 7 shows an optical microscope image of an enamel formed on a glass article using a comparative particle mixture.
Figure 8:
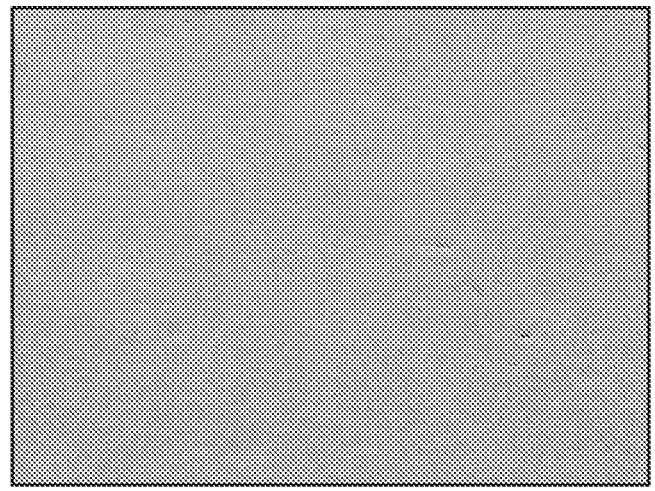
FIG. 8 shows an optical microscope image of an enamel formed on a glass article using a particle mixture according to the present invention.
Figure 9:
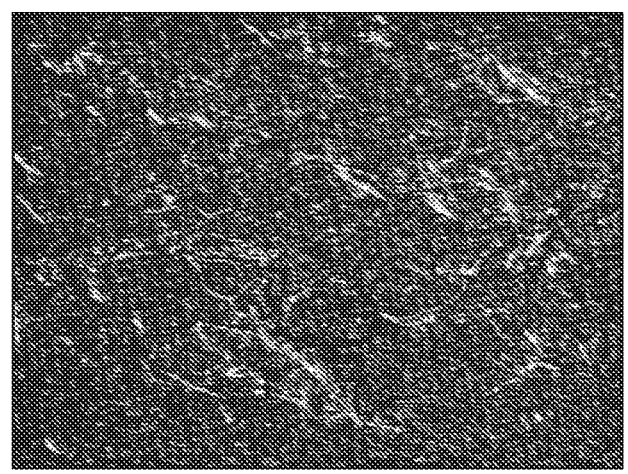
FIG. 9 shows an optical microscope image of an enamel formed on a glass article using a commercially available ink.
Figure 10:
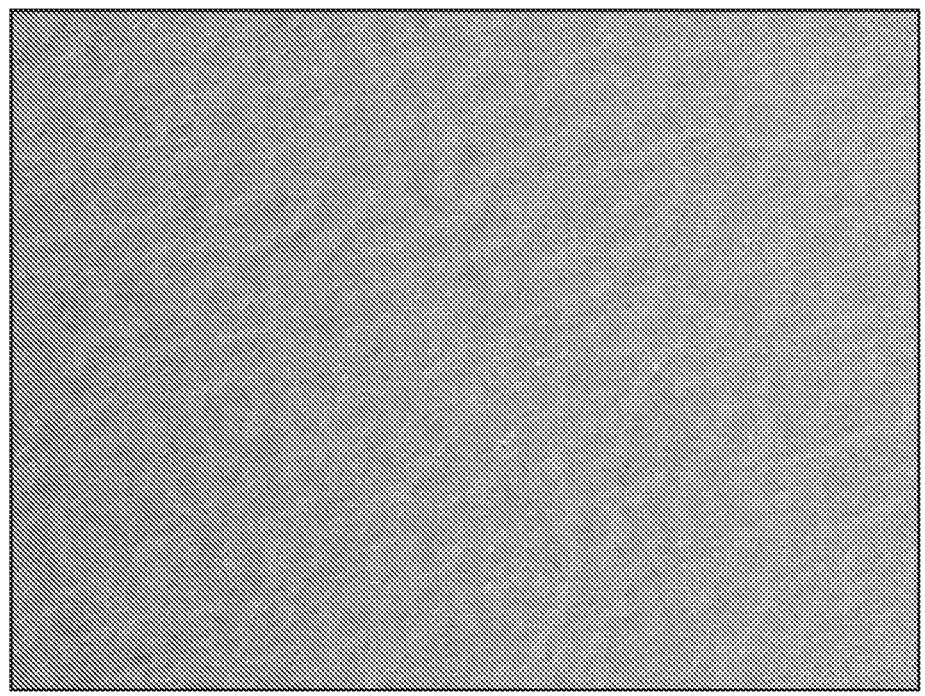
FIG. 10 shows an optical microscope image of an enamel formed on a glass article using a particle mixture according to the present invention.

Preferred and/or optional features of the invention will now be set out. Any aspect of the invention may be combined with any other aspect of the invention unless the context demands otherwise. Any of the preferred and/or optional features of any aspect may be combined, either singly or in combination, with any aspect of the invention unless the context demands otherwise.

The particle mixture of the present invention comprises particles of glass frit, which glass frit comprises silicon oxide ($SiO_2$), zinc oxide (ZnO) and sulfur (S). The glass frit is preferably crystallisable, that is the glass frit includes precursors of a compound which can be crystallised upon firing. For example, the glass frit may include precursors from which $Zn_2SiO_4$ may be crystallised upon firing.

The glass frit employed in the particle mixture of the present invention may comprise at least 25 wt. %, at least 28 wt. %, at least 30 wt. %, at least 33 wt. %, or at least 35 wt. % $SiO_2$. The glass frit may include 65 wt. % or less, 50 wt. % or less, 40 wt. % or less, or 37 wt. % or less of $SiO_2$. For example, the glass frit may include 25 to 65 wt. %, preferably, 30 to 50 wt. % of $SiO_2$.

The glass frit may include at least 19 wt. %, at least 20 wt. %, at least 22 wt. %, or at least 25 wt. % ZnO. The glass frit may include 59 wt. % or less, 50 wt. % or less, 40 wt. % or less, 35 wt. % or less, or 30 wt. % or less of ZnO. For example, the glass frit may preferably include 19 to 59 wt. %, preferably 20 to 40 wt. % of ZnO.

The glass frit may include greater than 0 wt. %, at least 0.1 wt. %, at least 1 wt. %, at least 2 wt. %, at least 3 wt. % or at least 4 wt. % S. The glass frit may include 6 wt. % or less, 5 wt. % or less, or 4 wt. % or less of S. For example, the glass frit may preferably include 0.1 to 5 wt. % of S.

The glass frit compositions described herein are given as weight percentages. These weight percentages are with respect to the total weight of the glass frit composition. The weight percentages are the percentages of the components used as starting materials in preparation of the glass frit compositions, on an oxide or elemental basis. As the skilled person will understand, starting materials other than oxides or elemental forms of a specific element may be used in preparing the glass frits of the present invention. Where a non-oxide starting material is used to supply an oxide of a particular element to the glass frit composition, an appropriate amount of starting material is used to supply an equivalent molar quantity of the element had the oxide of that element been supplied at the recited wt. %. For components where weight percentage is quoted on an elemental basis and where a non-elemental starting material is used, an appropriate amount of starting material is used to supply a molar quantity of the element equivalent to that which would be supplied had an elemental form of the element been supplied at the recited wt. %. This approach to defining glass frit compositions is typical in the art. As the skilled person will readily understand, volatile species (such as oxygen) may be lost during the manufacturing process of the glass frit, and so the composition of the resulting glass frit may not correspond exactly to the weight percentages of starting materials, which are given herein on an oxide or elemental basis. Analysis of a fired glass frit by a process known to those skilled in the art, such as Inductively Coupled Plasma Emission Spectroscopy (ICP-ES), can be used to calculate the starting components of the glass frit composition in question.

The glass frit employed in the particle mixture of the present invention may further comprise $B_2O_3$. For example, the glass frit may include at least 5 wt. %, at least 6 wt. %, or at least 7 wt. % of $B_2O_3$. The glass frit may include 14 wt. % or less, 12 wt. % or less, 10 wt. % or less, or 8 wt. % or less of $B_2O_3$. The glass frit may preferably include 7 to 14 wt. % of $B_2O_3$.

The glass frit may further include alkali metal oxide, for example one or more selected from $Li_2O$, $Na_2O$, $K_2O$, and $Rb_2O$, preferably one or more selected from $Li_2O$, $Na_2O$ and $K_2O$. For example, the glass frit may include 2 wt. % or more, 4 wt. % or more, 6 wt. % or more, 6.5 wt. % or more, 7 wt. % or more, or 7.5 wt. % or more alkali metal oxide. The glass frit may include 18 wt. % or less, 15 wt. % or less, 14 wt. % or less, 12 wt. % or less, 10 wt. % or less, or 8 wt. % or less alkali metal oxide.

The glass frit may include 0 wt. % or more, 0.1 wt. % or more, 0.5 wt. % or more, 1 wt. % or more, 2 wt. % or more, or 2.5 wt. % or more $Li_2O$. The glass frit may include 4 wt. % or less, 3 wt. % or less, 2.5 wt. % or less, 2 wt. % or less $Li_2O$. For example, the glass frit may include 1 to 3 wt. % of $Li_2O$.

The glass frit may include 0 wt. % or more, 0.1 wt. % or more, 0.5 wt. % or more, 1 wt. % or more, 2 wt. % or more, 3 wt. % or more, 4 wt. % or more, or 5 wt. % or more $Na_2O$. The glass frit may include 12 wt. % or less, 10 wt. % or less, 8 wt. % or less, 6 wt. % or less, or 5 wt. % or less $Na_2O$. For example, the glass frit may include 2 to 6 wt. % of $Na_2O$.

The glass frit may include 0 wt. % or more, 0.1 wt. % or more, 0.5 wt. % or more, 1 wt. % or more, 1.5 wt. % or more, 2 wt. % or more $K_2O$. The glass frit may include 3 wt. % or less 2.5 wt. % or less, 2 wt. % or less $K_2O$. For example, the glass frit may include 1.5 to 3 wt. % of $K_2O$.

The glass frit may further comprise $TiO_2$. The glass frit may include 0 wt. % or more, 1 wt. % or more, 2 wt. % or more, 2.75 wt. % or more, 3.5 wt. % or more, 4 wt. % or more, 5 wt. % or more, 5.5 wt. % or more, or 6 wt. % or more $TiO_2$. The glass frit may include 10 wt. % or less, 8 wt. % or less, 6 wt. % or less $TiO_2$. For example, the glass frit may include 0 to 10 wt. % of $TiO_2$.

The glass frit may further comprise F. The glass frit may include 0 wt. % or more, 0.1 wt. % or more, 0.2 wt. % or more, 0.3 wt. % or more, or 0.4 wt. % or more F. The glass frit may include 1 wt. %, 0.75 wt. % or less 0.6 wt. % or less, or 0.5 wt. % or less F. For example, the glass frit may include 0 to 1 wt. % of F.

The glass frit may further comprise BaO. The glass frit may include 0 wt. % or more, 0.5 wt. % or more, 1 wt. % or more, BaO. The glass frit may include 2 wt. % or less, 1.8 wt. % or less, or 1.5 wt. % or less BaO. For example, the glass frit may include 0.1 to 2 wt. % of BaO.

The glass frit may further comprise $V_2O_5$. The glass frit may include 0 wt. % or more, 0.1 wt. % or more, 0.5 wt. % or more, or 1 wt. % or more $V_2O_5$. The glass frit may include 2 wt. % or less, 1.5 wt. % or less, or 1 wt. % or less $V_2O_5$. For example, the glass frit may include 0.5 to 1.5 wt. % of $V_2O_5$.

The glass frit may further comprise $Ce_2O_3$. The glass frit may include 0 wt. % or more, 0.1 wt. % or more, 0.2 wt. % or more, or 0.3 wt. % or more $Ce_2O_3$. The glass frit may include 1 wt. % or less, 0.6 wt. % or less, or 0.5 wt. % or less $Ce_2O_3$. For example, the glass frit may include 0.1 to 0.5 wt. % of $Ce_2O_3$.

The glass frit may further comprise $Nb_2O_5$. The glass frit may include 0 wt. % or more, 0.1 wt. % or more, 0.2 wt. % or more, or 0.3 wt. % or more $Nb_2O_5$. The glass frit may include 1 wt. % or less, 0.6 wt. % or less, or 0.5 wt. % or less $Nb_2O_5$. For example, the glass frit may include 0.1 to 0.5 wt. % of $Nb_2O_5$.

In some embodiments, the glass frit is substantially lead-free. As used herein, the term "substantially lead-free" is intended to include glass frits which contain no intentionally added lead. For example, the glass frit may include less than 0.1 wt. % PbO, for example less than 0.05 wt. %, less than 0.01 wt. % or less than 0.005 wt. % PbO.

The glass frit may further comprise $Bi_2O_3$. The glass frit may include 1 wt. % or more, 5 wt. % or more, 10 wt. % or more, or 25 wt. % or more $Bi_2O_3$. The glass frit may include 50 wt. % or less, 40 wt. % or less, or 35 wt. % or less $Bi_2O_3$. For example, the glass frit may include 0 to 25 wt. % of $Bi_2O_3$.

In an alternative embodiment, the glass frit is substantially bismuth-free. As used herein, the term "substantially bismuth-free" is intended to include glass frits which contain no intentionally added bismuth. For example, the glass frit may include less than 0.1 wt. % $Bi_2O_3$, for example less than 0.05 wt. %, less than 0.01 wt. % or less than 0.005 wt. % $Bi_2O_3$.

The glass frit may include further components, such as further oxide components. Typically, the glass frit will include 20 wt. % or less, 10 wt. % or less, 7 wt. % or less, 5 wt. % or less, 3 wt. % or less, 2 wt. % or less, or 1 wt. % or less in total of further components. The glass frit may include at least 0.1 wt. % of further components. The further components may be one or more selected from the group consisting of magnesium oxide (MgO), aluminium oxide ($Al_2O_3$), and/or zirconium oxide ($ZrO_2$).

In one embodiment of the present invention, the glass frit may comprise:
a) 25 to 65 wt. % $SiO_2$;
b) 19 to 50 wt. % ZnO;
c) >0 to 6 wt. % S;
d) 0 to 40 wt. % $Bi_2O_3$;
e) 7 to 14 wt. % $B_2O_3$;
f) 0 to 3 wt. % $Li_2O$;
g) 0 to 7 wt. % $TiO_2$;
h) 4 to 12 wt. % $Na_2O$;
i) 0 to 3 wt. % $K_2O$;
j) 0 to 1 wt. % F;
k) 0 to 2 wt. % BaO;
l) 0 to 1 wt. % $V_2O_5$;
m) 0 to 1 wt. % $Ce_2O_3$; and
n) 0 to 1 wt. % $Nb_2O_5$.

The glass frit may consist essentially of a composition as described herein, and incidental impurities. In that case, as the skilled person will readily understand that the total weight % of the recited constituents will be 100 wt. %, any balance being incidental impurities. Typically, any incidental impurity will be present at 0.1 wt. % or less, 0.05 wt. % or less, 0.01 wt. % or less, 0.05 wt. % or less, 0.001 wt. % or less, or 0.0001 wt. % or less.

In one embodiment, the glass frit may consist essentially of:
a) 25 to 65 wt. % $SiO_2$;
b) 19 to 50 wt. % ZnO;
c) >0 to 6 wt. % S;
d) 0 to 40 wt. % $Bi_2O_3$;
e) 7 to 14 wt. % $B_2O_3$;
f) 0 to 3 wt. % $Li_2O$;
g) 0 to 7 wt. % $TiO_2$;
h) 4 to 12 wt. % $Na_2O$;
i) 0 to 3 wt. % $K_2O$;
j) 0 to 1 wt. % F;
k) 0 to 2 wt. % BaO;
l) 0 to 1 wt. % $V_2O_5$;
m) 0 to 1 wt. % $Ce_2O_3$;
n) 0 to 1 wt. % $Nb_2O_5$;
o) 0 to 10 wt. % of further components, which may optionally be selected from the group consisting of MgO, $Al_2O_3$ and/or $ZrO_2$; and
p) incidental impurities.

In the particle mixture of the present invention, the D90 particle size of the particles of glass frit is less than 5 microns. The D90 particle size of the particles of glass frit may be less than 4.8 microns, less than 4 microns, less than 3.5 microns, less than 3 microns, less than 2.5 microns, less than 2 microns, or less than 1.5 microns.

The term "D90 particle size" herein refers to particle size distribution, and a value for D90 particle size corresponds to the particle size value below which 90%, by volume, of the total particles in a particular sample lie. The D90 particle size may be determined using a laser diffraction method (e.g. using a Malvern Mastersizer 2000). In the particle mixture of the present invention, the D50 particle size of the particles of glass frit may be less than 1 micron, less than 0.9 microns, or less than 0.75 microns.

The term "D50 particle size" herein refers to particle size distribution, and a value for D50 particle size corresponds to the particle size value below which 50%, by volume, of the total particles in a particular sample lie. The D50 particle size may be determined using a laser diffraction method (e.g. using a Malvern Mastersizer 2000).

Additionally, (with the caveat that the D90 particle size is always higher than the D50 particle size), the D90 particle size of the particles of glass frit may be at least 1 micron, at least 1.2 microns, or at least 1.4 microns.

The particle mixture of the present invention may comprise a mixture of particles of two or more types of glass frit. However, it is preferred that the present invention employs a single frit system, i.e. the particle mixture of the present invention comprises particles of only one type of glass frit. In particular, where the present invention comprises a single frit system, it is preferred that the glass frit is substantially lead free, more preferably, the glass frit is substantially bismuth and lead free.

The particles of glass frit may be prepared by mixing together the raw materials and melting them to form a molten glass mixture, then quenching to form a glass. The process may further comprise milling the resulting glass to provide glass frit particles of the desired particle size. For example, the glass may be milled using a bead-milling process, such as wet bead-milling in an alcohol-based or a water-based solvent. The skilled person is aware of alternative suitable methods for preparing glass frit. Suitable alternative methods include water quenching, sol-gel processes and spray pyrolysis.

The particle mixture may comprise from 40 to 85 wt. % of glass frit, preferably 75-85 wt. % of glass frit, based on total weight of the particle mixture.

The particle mixture of the present invention further comprises particles of a crystalline oxide material. As used herein, the term "crystalline oxide material" means an oxide material having a minimum degree of crystallinity of 30%, as determined using x-ray diffraction (XRD). For example, the crystalline oxide material may be an oxide compound having a crystallinity level in the range 30 to 100%, as determined using XRD. The crystalline oxide material is typically a polycrystalline oxide material.

The crystalline oxide material may be selected from silicon oxides, zinc oxides, zinc borates, zinc silicates, silicon zirconates, aluminium silicates, calcium silicates and mixtures thereof. For example, the crystalline oxide material may be selected from $SiO_2$, $Zn_2SiO_4$, $ZnO.B_2O_3$, $3ZnO.B_2O_3$, $5ZnO.2B_2O_3$, $Al_2SiO_5$ and mixtures thereof. Preferably, the crystalline oxide material comprises $Zn_2SiO_4$, for example, the crystalline oxide material may comprise manganese doped $Zn_2SiO_4$.

In order to provide particles of the crystalline oxide material of the desired particle size, the crystalline oxide material may be subjected to milling. For example, the crystalline oxide material may be milled using a bead-milling process, such as wet or dry bead-milling. Wet bead-milling may be carried out using an alcohol based solvent, for example butyl diglycol.

The particle mixture may comprise from 0.1 to 15 wt. % of crystalline oxide material, preferably 0.1 to 10 wt. %, more preferably 0.1-5 wt. % of crystalline oxide material, based on total weight of the particle mixture.

In the particle mixture of the present invention, the D90 particle size of the particles of crystalline oxide material is less than 5 microns. The D90 particle size of the particles of crystalline oxide material may be less than 4.8 microns, less than 4 microns, less than 3.5 microns, less than 3 microns, less than 2.5 microns, less than 2 microns, or less than 1.5 microns.

Preferably, the D90 particle size of the particles of crystalline oxide material is less than or equal to the D90 particle size of the particles of glass frit. More preferably, the D90 particle size of the particles of crystalline oxide material is less than the D90 particle size of the particles of glass frit.

Preferably, in the particle mixture of the present invention, the D50 particle size of the particles of crystalline oxide material is less than 1 micron, preferably less than 0.9 microns, more preferably less than 0.75 microns.

Additionally, (with the caveat that the D90 particle size is always higher than the D50 particle size), the D90 particle size of the particles of crystalline oxide material may be at least 1 micron, at least 1.2 microns, or at least 1.4 microns.

The weight ratio of glass frit to crystalline oxide material in the particle mixture of the present invention may be in the range 90.00:10.00 to 99.90:0.10. Preferably, the weight ratio of glass frit to crystalline oxide material in the present invention is in the range 99.00:1.00 to 99.90:0.10, more preferably in the range 99.50:0.50 to 99.85:0.15.

The particle mixture may further comprise particles of a pigment, such as a mixed metal oxide pigment or a carbon black pigment. When used, such pigments may constitute no greater than about 55 wt. %, preferably 10-25 wt. % of the particle mixture, depending upon the range of colour, gloss, and opacity desired in the enamel.

Suitable pigments may comprise complex metal oxide pigments, such as corundum-hematite, olivine, priderite, pyrochlore, rutile, and spinel. Other categories such as baddeleyite, borate, garnet, periclase, phenacite, phosphate, sphene and zircon may be suitable in certain applications.

Typical complex metal oxide pigments which may be used to produce black colours in the automotive industry include transition metal oxides having spinel-structure, such as spinel-structure oxides of copper, chromium, iron, cobalt, nickel, manganese, and the like. Although these black spinel pigments are preferred for use in the automotive industry, other metal oxide pigments to produce other various colours can be employed in the present invention. Examples of other end uses include architectural, appliance, and beverage industries.

Examples of commercially available pigments suitable for use in the present invention include $CuCr_2O_4$, $(Co,Fe)(Fe,Cr)_2O_4$, (NiMnCrFe), and the like.

Mixtures of two or more pigments may also be employed in the particle mixture of the present invention.

Preferably, the D90 particle size of the particles of pigment is less than or equal to the D90 particle size of the particles of glass frit. More preferably, the D90 particle size of the particles of pigment is less than the D90 particle size of the particles of glass frit.

The D90 particle size of the particles of pigment may be less than 5 microns, less than 4 microns or less than 2 microns. Preferably, the D90 particle size of the particles of pigment is less than 1.2 microns.

The particle mixture of the present invention may be prepared by mixing particles of glass frit and particles of crystalline oxide material. Where pigment is employed, the particle mixture may be prepared by mixing particles of glass frit, particles of crystalline oxide material and particles of pigment.

The particle mixture of the present invention may be combined with a liquid dispersion medium to form an ink according to the second aspect of the present invention. As used herein, the term "liquid dispersion medium" refers to a substance which is in the liquid phase at the conditions intended for application of the ink to a substrate (i.e. printing). Thus, at ambient conditions the liquid dispersion medium may be solid or a liquid too viscous for printing. As the skilled person will readily understand, combination of the particle mixture with a liquid dispersion medium may take place at elevated temperature if required.

The liquid dispersion medium to be employed in the ink of the present invention may be selected on the basis of the application method to be employed (for example, screen printing, roller coating or inkjet printing) and the intended end use of the enamel. Typically, the liquid dispersion medium comprises an organic liquid.

In one embodiment, the liquid dispersion medium adequately suspends the particle mixture at application conditions, and is removed completely during drying and/or firing or pre-firing of the applied coating. Factors influencing the choice of medium include solvent viscosity, evaporation rate, surface tension, odour and toxicity. Suitable mediums preferably exhibit non-Newtonian behavior at printing conditions. Suitable mediums are typically organic. Suitably, the medium comprises one or more of water, alcohols, glycol ethers, lactates, glycol ether acetates, aldehydes, ketones, aromatic hydrocarbons and oils. Mixtures of two or more solvents are also suitable.

In an alternative embodiment, the liquid dispersion medium may be curable on exposure to thermal or actinic (e.g. UV) radiation. In this embodiment, the liquid dispersion medium adequately suspends the particle mixture at application conditions, and is then cured by exposing the applied coating to thermal or actinic radiation. The components of the cured liquid dispersion medium will subsequently be removed during firing or pre-firing of the applied coating. Suitable curable liquid dispersion media may include, for example, cross-linkable acrylates and/or methoacrylates.

Preferred liquid dispersion mediums include diethylene glycol monobutyl ether, dipropylene glycol monomethyl ether, tripropylene glycol monomethyl ether, dibasic esters, and 1-methoxy 2-propanol. A particularly preferred medium comprises dipropylene glycol monomethyl ether.

The ink may further comprise one or more additives. These may include dispersing agents, such as, but not limited to those from the BYKJET, disperBYK, Solsperse or Dispex ranges, in particular BYKJET 9151, and/or rheology modifiers.

The ink of the present invention may comprise from about 40 to about 80 wt. % of the particle mixture described above and about 20 to about 60 wt. % of the liquid dispersion medium, based on total weight of the ink. The skilled person would be capable of selecting the appropriate amounts of particle mixture and liquid dispersion medium according to the desired method of applying the ink to a substrate. For example, where the ink is to be applied to a substrate via screen printing, the ink may comprise about 50 to about 80 wt. % of the particle mixture. Where the ink is to be applied to a substrate via roller coating or inkjet printing, the ink may comprise about 40 to about 60 wt. % of the particle mixture.

In some embodiments, the ink is preferably substantially lead-free, that is, any lead-containing components are substantially absent from the ink. For example, the ink may comprise less than 0.1 wt. % lead.

In some embodiments, the ink is preferably substantially bismuth-free, that is, any bismuth-containing components are substantially absent from the ink. For example, the ink may comprise less than 0.1 wt. % bismuth.

The rheology of the ink can be adjusted depending on the technique to be used to apply the ink onto a substrate. The viscosity of the ink can be modified by the use of viscous resins such as vinyl resins, solvents, film formers such as cellulosic materials, and the like, or by the addition of small amounts of ammonia solution. In one embodiment, for example where the ink is to be applied to the substrate via roller coating or inkjet printing, the ink may have a viscosity of less than 50 mPa·s at a shear rate of $1000$ $s^{-1}$ and a temperature of 25° C., preferably less than 20 mPa·s at a shear rate of $1000$ $s^{-1}$ and a temperature of 25° C. In another embodiment, for example where the ink is to be applied to a substrate via screen printing, the ink may have a viscosity in the range 8 to 20 Pa·s at a shear rate of $10$ $s^{-1}$ and a temperature of 25° C.

The ink of the present invention may be prepared by mixing:
a) particles of glass frit, which glass frit comprises silicon oxide ($SiO_2$), zinc oxide (ZnO) and sulfur (S);
b) particles of a crystalline oxide material; and
c) a liquid dispersion medium;
wherein each of components a) and b) have a D90 particle size of less than 5 microns.

The components may be mixed, for example, using a propeller mixer, a high shear mixer, or a bead-mill. In some embodiments, the liquid dispersion medium and/or the combined components may be heated prior to and/or during mixing.

The ink of the present invention may be employed in a method of forming an enamel on a substrate. Such a method may comprise applying a coating of an ink as described above onto the substrate and firing the applied coating.

The coating of ink may be applied to a substrate via a suitable printing method. In one embodiment, the coating of ink may be applied to a substrate via screen printing, for example, using a suitable screen and a squeegee. In another embodiment, the coating of ink may be applied to a substrate via roller coating. In a further embodiment, the ink is applied to the substrate via inkjet printing, wherein ink droplets are discharged by a digitally controlled print head directly onto a substrate. For example, thermal drop-on-demand inkjet printing and piezoelectric drop-on-demand inkjet printing techniques may be suitable.

After application of the ink coating to the substrate and prior to firing, the applied coating may undergo a drying step for removal or partial removal of solvents present in the liquid dispersion medium. Drying may be carried out at temperatures of up to 200° C. Drying may be carried out, for example, by air drying the applied coating at ambient temperature, by heating the ink-coated substrate in a suitable oven, or by exposing the ink-coated substrate to infrared radiation.

Alternatively, where an appropriate liquid dispersion medium is employed, the applied coating may undergo a curing step, for example, by exposing the applied coating to radiation capable of initiating curing.

The applied coating may be fired by heating the coated substrate to a temperature sufficiently high to cause the glass frit to melt and fuse to the substrate, and to burn off any remaining components deriving from the liquid dispersion medium. For example, the firing may be carried out by heating the coated substrate to a temperature in the range 500 to 1000° C., for example, 540 to 840° C. Heating the coated substrate may be carried out using a suitable furnace, such as a continuous line furnace.

Subsequent to any drying or curing steps and prior to firing of the applied coating, the coating may undergo a pre-firing step. As used herein "pre-firing" refers to heating the coated substrate to a temperature in the range >200° C. to 600° C., for removal of non-volatile components deriving from the liquid dispersion medium, for example, non-volatile organics. Pre-firing may be carried out using a suitable furnace, such as a continuous line furnace.

In the method of forming an enamel of the present invention, the substrate to which the ink is applied may be a glass substrate, a ceramic substrate or a metal substrate. In a preferred embodiment the substrate is a glass substrate.

The coating of ink applied to the substrate, prior to any drying, firing or pre-firing steps, may have a thickness (wet film thickness) in the range 10 to 60 microns. Where the ink is applied to the substrate via roller coating or inkjet printing, the coating of ink preferably has a wet film thickness in the range 20 to 40 microns. Where the ink is applied to the substrate via screen printing, the coating of ink preferably has a wet film thickness in the range 10 to 25 microns.

The thickness of the resulting enamel (after firing) may be less than or equal to 12 microns, preferably less than or equal to 11 microns, more preferably less than or equal to 10 microns.

A particular advantage of the present invention is that the use of reduced particle sizes allows for enhanced particle packing within the particle mixture, which thereby allows high optical densities to be achieved at reduced enamel thicknesses.

Optical density is an indicator of the opacity of the enamel. The optical density of a substance is the logarithmic ratio of the intensity of transmitted light to the intensity of the incident light passing through the substance. Optical density (OD) is expressed as the negative logarithm of transmittance (T), i.e. $OD=-\log_{10}T$, where transmittance is the ratio of the intensity of light transmitted through a sample to the intensity of the incident light. For automotive obscuration enamels, a minimum optical density of from 2 to 4 is generally required. Optical density of an enamel may be measured using a suitable densitometer, for example a Tobias TQ Densitometer (available from Tobias Associates, Inc).

In a preferred embodiment of the method of forming an enamel on a substrate, the substrate is a glass sheet and the firing of the applied coating takes place immediately prior to or during a pressure forming process for shaping the glass sheet. For example, a coating of ink may be applied to a sheet of glass in the desired region and the coated glass may then be subjected to elevated temperature in order to cause firing of the coating and to cause softening of the glass sheet. The softened glass sheet may then be subjected to pressure forming using a die or mould, to bend the glass into its final desired shape. In such a process, it has been found that the present invention provides improved anti-stick properties, i.e. that it is less likely that the enamel will stick to the mould or die employed in pressure forming.

In a particularly preferred embodiment, such a method may be employed to manufacture an automotive window having a coloured (typically black) obscuration enamel situated at the periphery of the window. For example, the method may be employed to apply an obscuration enamel to the periphery of a sheet of glass for use as an automotive side or rear window. The sheet of glass may undergo a tempering or toughening process prior to or after application of the enamel and any pressure forming steps.

Alternatively, the method may be employed to apply an obscuration enamel to an automotive front windshield. Automotive front windshields are typically laminated glass windows. Laminated glass windows may comprise an interlayer of flexible plastic material disposed between inner and outer layers of glass. The interlayer may comprise, for example, polyvinylbutyral ("PVB"), polyvinyl chloride ("PVC"), polyurethane ("PU") or an ethyl vinyl acetate ("EVA"). The use of such laminated glass may increase penetration resistance of the windshield and reduce the risk of laceration by fragments of glass during an impact. Automotive windshields comprised of laminated glass, typically have a coloured (e.g. black) obscuration enamel disposed at the periphery of one face of one of the glass layers, preferably the inner face of the outer layer of glass. Alternatively, the obscuration enamel may be disposed at the periphery of one face of each of the glass layers, for example the inner face of each layer of glass. In the method of the present invention, the coating of ink may be applied to the periphery of a face of one or both of the glass layers and fired prior to the assembly of the glass layers with the interlayer.

In addition to the automotive uses described herein, the particle mixture and/or the ink of the present invention may be employed in the formation of decorative and/or functional enamels on glass for other purposes, such as architectural glass, appliance glass, glass bottles etc.

The present invention also provides a substrate having an enamel formed thereon, wherein the enamel is obtained or obtainable by applying a coating of an ink as described above onto the substrate and firing the applied coating.

The present invention also provides a glass sheet having an enamel formed on at least a portion of a surface of the sheet, wherein the enamel has an optical density of at least 2.5 and a thickness of less than or equal to 12 microns.

The present invention also provides a glass sheet having a curved section and having an enamel formed on at least a portion of a surface of the curved section of the sheet, wherein the enamel has an optical density of at least 2.5 and a thickness of less than or equal to 12 microns.

The present invention also provides an automotive window pane comprising a glass sheet having a curved section and having an enamel formed on at least a portion of a surface of the curved section of the sheet, wherein the enamel has an optical density of at least 2.5 and a thickness of less than or equal to 12 microns.

In these aspects of the present invention, the enamel may have a thickness of less than or equal to 12 microns, less than or equal to 11 microns, or less than or equal to 10 microns.

Further, in these aspects of the present invention, the enamel may have an optical density of greater than or equal to 2.5, preferably greater than or equal to 3, more preferably greater than or equal to 3.5.

EXAMPLES

The invention will now be further described with reference to the following examples, which are illustrative, but not limiting of the invention.

Glass Frit Particles

Particles of glass frits (a) and (b), having the compositions shown in Table 1 below, were prepared as follows. Commercially available raw materials were mixed using a laboratory mixer. The mixture of raw materials was melted in an alumina crucible, in a gas furnace. Melting was carried out at 1350° C. for 55 minutes. The resulting molten glass was quenched in water to obtain the glass frit.

The glass was then subjected to jet milling to provide coarse milled glass frit particles having a D90 particle size of approximately 6 µm. The coarse milled glass frit particles were then subjected to wet bead-milling. The wet milling mixture comprised 50 wt. % glass fit, 49.2 wt. % Dowanol™ DPM (available from Dow) and 0.8 wt. % BykJet-9151 dispersant (available from Byk). The mixture was bead milled until the glass frit particles had a D90 particle size of approximately 1.4 μm. Particle size of the glass frit was determined using a laser diffraction method using a Malvern Mastersizer 2000.

TABLE 1

| Component | Weight % | |
|---|---|---|
| | Frit (a) | Comparative Frit (b) |
| $SiO_2$ | 42.9 | 43.95 |
| ZnO | 29.15 | 29.75 |
| $B_2O_3$ | 7.43 | 7.40 |
| $Li_2O$ | 2.77 | 2.86 |
| $TiO_2$ | 7.31 | 7.05 |
| $Na_2O$ | 4.05 | 3.42 |
| S | 0.81 | — |
| $K_2O$ | 2.35 | 2.43 |
| F | 0.45 | 0.40 |
| BaO | 1.31 | 0.95 |
| $V_2O_5$ | 1.15 | 1.44 |
| $Ce_2O_3$ | 0.33 | 0.34 |

Particles of Crystalline Oxide Material

Particles of crystalline oxide material (i) were prepared by synthesizing a suitable crystalline oxide material and then subjecting the synthesized material to wet bead-milling. The wet milling mixture comprised 50 wt. % of the crystalline oxide material and 50 wt. % Dowanol™ DPM. The mixture was bead milled until the crystalline oxide material had a D90 particle size of approximately 1.4 μm. Particle size of crystalline oxide material (i) was determined using a laser diffraction method using a Malvern Mastersizer 2000.

Figure 11:
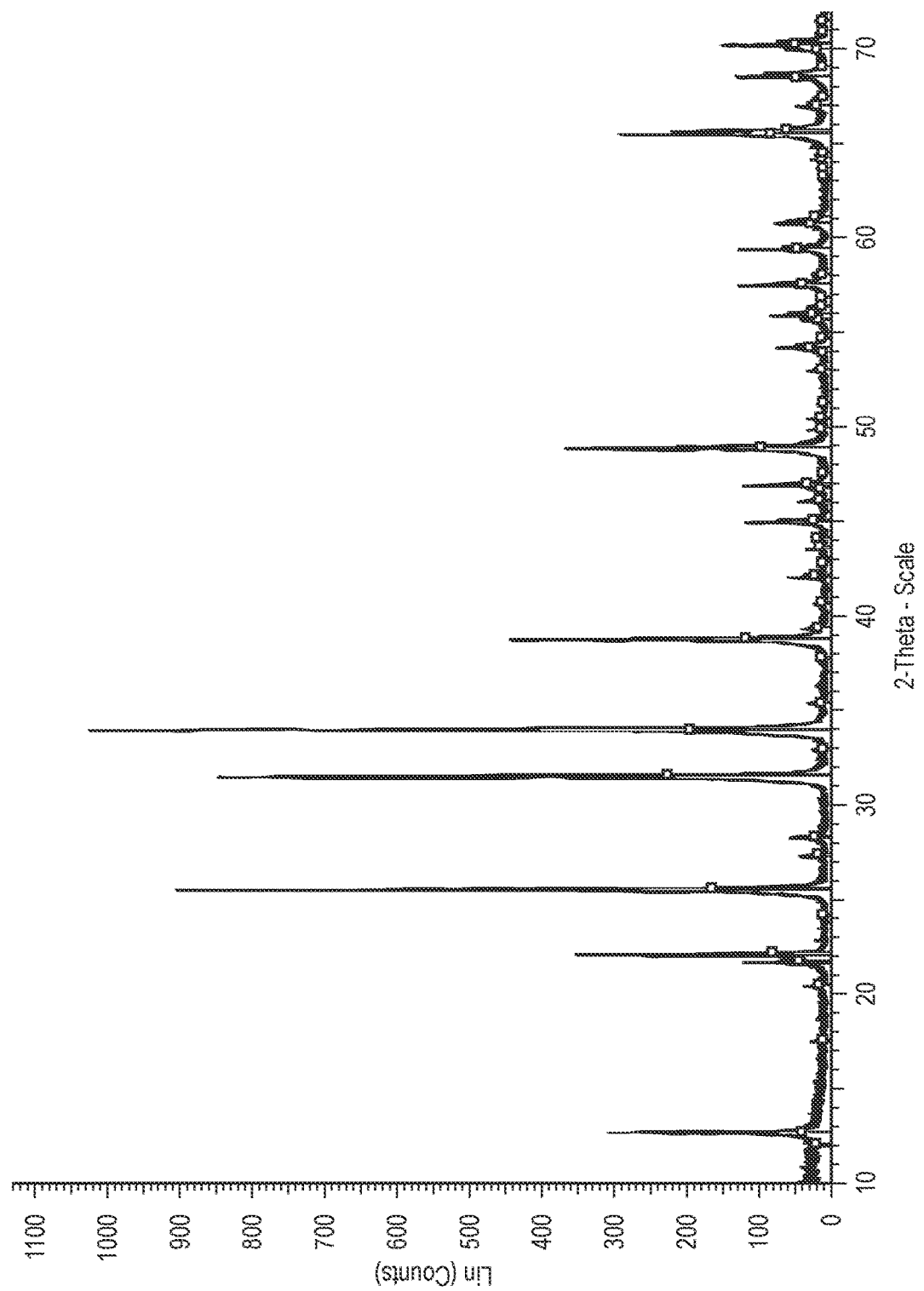
FIG. 11 is an x-ray diffraction spectra of a commercially available crystalline oxide material.

Crystalline oxide material (ii) is a commercially available single-phase, crystalline manganese-doped $Zn_2SiO_4$ having a D50 particle size of 254 nm (purchased from Sigma-Aldrich (cas: 68611-47-2)). A suspension of particles of crystalline oxide material (ii) was prepared by mixing the particles with Dowanol™ DPM solvent. The suspension comprised 50 wt. % Mn-doped $Zn_2SiO_4$ particles and 50 wt. % Dowanol™ DPM. FIG. 11 is an X-ray diffraction spectra of crystalline oxide material (ii).

Particles of Pigment

Commercially available black pigment Black 1G (available from The Shepherd Color Company) was subjected to wet bead-milling. The wet milling mixture comprised 50 wt. % pigment, 48.5 wt. % Dowanol™ DPM and 1.5 wt. % BykJet-9151 dispersant. The pigment was bead milled until a D90 particle size of approximately 0.6 μm was achieved. Particle size of the pigment was determined using a laser diffraction method using a Malvern Mastersizer 2000.

Resin

A solution of resin was prepared by heating a mixture comprising 20 wt. % Klucel E3042 (available from Ashland Industries) and 80 wt. % Dowanol DPM to 90° C. with agitation. Heating and agitation of the mixture was continued until a homogenous, clear and thick solution was obtained.

Preparation of Inks

To prepare Inks 1 and 2, a suspension of glass frit particles, a suspension of particles of crystalline oxide material (i) and a suspension of pigment particles (each suspended in their respective milling liquids) were combined and then mixed with the resin solution prepared as described above and with isopropyl-alcohol solvent and BykJet-9151 surfactant to form an ink. Mixing was carried out at 3000 rpm for 2 minutes using a hi-speed mixer. Prior to combination with the other components, the suspension of glass frit particles and the suspension of particles of crystalline oxide material (i) were combined in relative proportions of 83 wt. % glass frit suspension and 17 wt. % crystalline oxide suspension and milled using a planetary mill for 2 hours at 350 rpm.

To prepare Ink 3, a suspension of glass frit particles (suspended in milling liquid), a suspension of particles of crystalline oxide material (ii) (suspension prepared as described above) and a suspension of pigment particles (suspended in milling liquid) were combined and then mixed with the resin solution prepared as described above and with isopropyl-alcohol solvent and BykJet-9151 surfactant to form an ink. Mixing was carried out at 3000 rpm for 2 minutes using a hi-speed mixer. Prior to combination with the other components, the suspension of glass frit particles and the suspension of particles of crystalline oxide material (ii) were combined in relative proportions of 83 wt. % glass frit suspension and 17 wt. % crystalline oxide suspension and milled using a planetary mill for 2 hours at 350 rpm.

The compositions of Inks 1, 2 and 3 are set out in Table 2 below.

TABLE 2

| | Ink 1 | Ink 2 | Ink 3 |
|---|---|---|---|
| Glass Frit | (a) | (b) | (a) |
| Crystalline Oxide Material | (i) | (i) | (ii) |
| Component | Wt. % | | |
| Suspension comprising 50 wt. % glass frit particles 49.2 wt. % Dowanol™ DPM and 0.8 wt. % BykJet-9151 | 57.35 | 57.35 | 57.35 |
| Suspension comprising 50 wt. % particles of crystalline oxide material and 50 wt. % Dowanol™ DPM | 11.75 | 11.75 | 11.75 |
| Suspension comprising 50 wt. % pigment particles 48.5 wt. % Dowanol™ DPM and 1.5 wt. % BykJet-9151 | 13.2 | 13.2 | 13.2 |
| Isopropyl-alcohol | 14.4 | 14.4 | 14.4 |
| BykJet-9151 dispersant | 2.5 | 2.5 | 2.5 |
| Resin solution comprising 20 wt % Klucel E3042 and 80 wt. % Dowanol DPM | 0.8 | 0.8 | 0.8 |

Ink 4 is commercially available black obscuration ink, 1T3030-IR815A available from Johnson Matthey having a solids portion with a D90 particle size in the range 8 μm to 12 μm.

Ink 5 was prepared by combining Ink 3 with ammonia solution in the relative proportions 96 wt. % Ink 3 and 4 wt. % ammonia solution. The ammonia solution comprised 25 wt. % ammonia and was purchased from an Hees B.V. (cas: 1336-21-6).

Preparation of Enamelled Glass Articles

Glass articles A to D having enamels formed thereon were prepared according to the following procedure. Inks 1 and 2 were inkjet printed onto glass substrates using a Xaar's 1002 GS6 printhead, with a jetting frequency of 3 kHz, at 7 dpd (drops per dot) and 360×360 dpi (drops per inch) and a drop volume of 6 picolitres. The applied ink coatings were then dried at 120° C. for approximately 10 minutes. The thickness of each applied coating after drying is shown in Table 3.

Glass article E having an enamel formed thereon was prepared according to the following procedure. Ink 3 was applied to a glass substrate via roller coating using Elcometer 3520 Baker Film Applicator. Ink 3 was coated on the substrate at wet layer thickness of 30 µm. The applied ink coating was then dried at 120° C. for approximately 10 minutes. The thickness of the applied coating after drying is shown in Table 3.

Ink 4 was used to prepare glass articles F and G. The commercially available ink was screen printed onto glass substrates using a 90T mesh screen and a squeegee. The applied ink coatings were then dried at 120° C. for approximately 10 minutes. The thickness of the applied coatings after drying are shown in Table 3.

Glass article H having an enamel formed thereon was prepared according to the following procedure. Ink 5 was applied to a glass substrate via screen printing using 77T mesh screen and a squeegee. The applied ink coating was then dried at 120° C. for approximately 10 minutes. The thickness of the applied coating after drying is shown in Table 3.

TABLE 3

| Glass Article | A | B | C | D | E | F | G | H |
|---|---|---|---|---|---|---|---|---|
| Ink | 1 | 1 | 2 | 2 | 3 | 4 | 4 | 5 |
| Dried layer thickness (µm) | 78 | 8 | 60 | 15 | 15 | 30 | 15 | 7 |

Each of coated glass articles A to H were heated to elevated temperature sufficient to soften the glass and to fire the printed coating and were simultaneously subjected to a press-bending process by the application of a shaped die at an applied force of 9.5 N. The conditions of heating and press-bending are set out in Table 4 below. The die employed for press bending was covered with a metal cloth.

TABLE 4

| Glass Article | A | B | C | D | E | F | G | H |
|---|---|---|---|---|---|---|---|---|
| Ink used to prepare glass article | 1 | 1 | 2 | 2 | 3 | 4 | 4 | 5 |
| Kiln temperature (° C.) | 780 | 840 | 780 | 840 | 840 | 780 | 840 | 780 |
| Maximum temperature at surface of enamel (° C.) | 695 | 710 | 695 | 710 | 710 | 695 | 710 | 695 |

TABLE 4-continued

| Glass Article | A | B | C | D | E | F | G | H |
|---|---|---|---|---|---|---|---|---|
| Duration (s) | 180 | 130 | 180 | 130 | 130 | 180 | 130 | 180 |
| Force applied (N) | 9.5 | 9.5 | 9.5 | 9.5 | 9.5 | 9.5 | 9.5 | 9.5 |

Enamelled glass articles $A^i$ to $H^i$ correspond to enamelled glass articles A to H and were prepared in exactly the same manner except that the coated glass articles were fired without being simultaneously subjected to press-bending.

Anti-Stick Testing

The degree of sticking which occurred during press-bending was assessed by visually checking enamelled glass articles A to H for the presence of mesh marks in the enamel left by the metal cloth cover of the press bending die, and by measuring surface roughness of each enamel. Surface roughness is measured by carrying out a surface contour scan on a 1 cm section of the enamelled glass article using a NanoFocus µscan optical profilometer (available from NanoFocus AG). The average surface roughness (Ra) is the mean of peak heights and depths across the surface contour scan.

For comparison, surface roughness (Ra) of enamelled glass articles $A^i$ to $H^i$ was measured in the same manner. For glass articles A to H, an increase in surface roughness compared with the corresponding non-bent enamelled glass article, and/or the presence of mesh marks indicates that sticking has taken place during the press bending process.

The results of the anti-stick testing are shown in Table 5 below.

TABLE 5

| Enamelled Glass Article | $A^i$ | $B^i$ | $C^i$ | $D^i$ | $E^i$ | $F^i$ | $G^i$ | $H^i$ |
|---|---|---|---|---|---|---|---|---|
| Average Surface Roughness, Ra (microns) | <0.5 | <0.5 | <0.5 | <0.5 | <0.5 | 0.9-1.1 | 0.9-1.1 | ~0.9 |

| Enamelled Glass Article | A | B | C | D | E | F | G | H |
|---|---|---|---|---|---|---|---|---|
| Average Surface Roughness, Ra (microns) | <0.5 | <0.5 | >1.3 | >1.3 | <0.5 | 0.9-1.7 | >1.3 | ~0.9 |
| Visual inspection | * | * | *** | *** | * | ** | ** | * |

\* No significant mesh marks visible
\*\* Mesh marks clearly visible
\*\*\* Severe mesh marks visible The surface contour scans of the enamels formed on glass articles B, D, E, F and H, after firing, are shown in FIGS. 1 to 5 respectively. Optical microscope images (taken using a Nikon SMZ800 with a 10× magnification) of enamelled glass articles B, D, E, G and H are shown in FIGS. 6 to 10 respectively.

The results shown in Table 5 and FIGS. 1 to 10 demonstrate that the particle mixture of the present invention allows good anti-stick properties to be achieved when employed in the formation of an enamel on a glass substrate which is to be subjected to a pressure forming process.

Optical Density Measurement

The optical density of the enamel formed on each of glass articles A, B, E F and G was measured using a Tobias TQ densitometer (available from Tobias Associates, Inc). It was not possible to measure the optical density of the enamels formed on glass articles C and D due to the severe sticking which had occurred during press bending.

The measured optical densities and the thickness of the enamels after firing are shown in Table 6 below.

TABLE 6

|  | A | B | E | F | G |
|---|---|---|---|---|---|
| Optical Density | 4-4.8 | 4-4.8 | 3.8 | 3-3.5 | 2-3 |
| Enamel thickness (μm) | 40 | 7 | 8 | 18 | 12 |

The results shown in Table 6 demonstrate that the particle mixture of the present invention allows high optical density to be achieved at reduced enamel thicknesses.

The invention claimed is:

1. A particle mixture comprising particles of glass frit and particles of a crystalline oxide material, wherein the glass frit comprises 25 to 65 wt. % silicon oxide ($SiO_2$), 19 to 59 wt. % zinc oxide (ZnO) and >0 to 6 wt. % sulfur (S), wherein the D90 particle size of the particle mixture is less than 5 microns, and wherein the D90 particle size of the particles of crystalline oxide material is less than 4 microns.

2. The particle mixture according to claim 1 wherein the glass frit further comprises:
   0 to 40 wt % $Bi_2O_3$;
   7 to 14 wt % $B_2O_3$;
   0 to 3 wt % $Li_2O$;
   0 to 7 wt % $TiO_2$;
   4 to 12 wt % $Na_2O$;
   0 to 3 wt % $K_2O$;
   0 to 1 wt % F;
   0 to 2 wt % BaO;
   0 to 1 wt % $V_2O_5$;
   0 to 1 wt % $Ce_2O_3$; and
   0 to 1 wt % $Nb_2O_5$.

3. The particle mixture according to claim 1 wherein the glass frit comprises less than 0.1 wt. % PbO.

4. The particle mixture according to claim 1 wherein the glass frit comprises less than 0.1 wt. % $Bi_2O_3$.

5. The particle mixture according to claim 1 wherein the D90 particle size of the particles of glass frit is less than 4 microns.

6. The particle mixture according to claim 1 wherein the crystalline oxide material is selected from silicon oxides, zinc oxides, zinc borates, zinc silicates, silicon zirconates, aluminium silicates, calcium silicates and mixtures thereof.

7. The particle mixture according to claim 6 wherein the crystalline oxide material is selected from $SiO_2$, $Zn_2SiO_4$, $ZnO.B_2O_3$, $3ZnO.B_2O_3$, $5ZnO.2B_2O_3$, $Al_2SiO_5$ and mixtures thereof.

8. The particle mixture according to claim 1 wherein the D90 particle size of the particles of crystalline oxide material is less than 3 microns.

9. The particle mixture according to claim 1 wherein the D90 particle size of the particles of crystalline oxide material is less than the D90 particle size of the particles of glass frit.

10. The particle mixture according to claim 1 wherein the weight ratio of glass frit to crystalline oxide material is in the range 90.00:10.00 to 99.90:0.10.

11. The particle mixture according to claim 1 which further comprises particles of pigment.

12. The particle mixture according to claim 11 wherein the pigment is a black pigment.

13. The particle mixture according to claim 11 wherein the pigment is a transition metal oxide having spinel-structure.

14. The particle mixture according to claim 11 wherein the pigment is selected from spinel-structure oxides of copper, chromium, iron, cobalt, nickel, manganese, or mixtures thereof.

15. The particle mixture according to claim 11 wherein the pigment is selected from $CuCr_2O_4$, $(Co,Fe)(Fe,Cr)_2O_4$, (NiMnCrFe), and mixtures thereof.

16. The particle mixture according to claim 1 comprising:
   40 to 85 wt. % of glass frit;
   0.1 to 15 wt. % of crystalline oxide material; and
   0 to 55 wt. % of pigment.

17. The particle mixture according to claim 1 comprising 10 to 55 wt. % of pigment.

18. The particle mixture according to claim 16 comprising:
   10 to 25 wt. % of pigment.

19. The particle mixture of claim 1, further comprising a liquid dispersion medium in which the particle mixture is dispersed, thereby forming an ink.

20. The particle mixture according to claim 1 wherein the glass frit comprises less than 0.05 wt. % PbO.

21. The particle mixture according to claim 1 wherein the glass frit comprises less than 0.01 wt. % PbO.

22. The particle mixture according to claim 1 wherein the glass frit comprises less than 0.005 wt. % PbO.

23. The particle mixture according to claim 1 wherein the glass frit comprises less than 0.05 wt. %, $Bi_2O_3$.

24. The particle mixture according to claim 1 wherein the glass frit comprises less than 0.01 wt. % $Bi_2O_3$.

25. The particle mixture according to claim 1 wherein the glass frit comprises less than 0.005 wt. % $Bi_2O_3$.

26. The particle mixture according to claim 1 wherein the D90 particle size of the particles of crystalline oxide material is less than 2 microns.

27. The particle mixture according to claim 1 wherein the D90 particle size of the particles of crystalline oxide material is less than 1.5 microns.

28. The particle mixture according to claim 1 wherein the D90 particle size of the particles of glass frit is less than 3 microns.

29. The particle mixture according to claim 1 wherein the D90 particle size of the particles of glass frit is less than 2 microns.

30. The particle mixture according to claim 1 wherein the D90 particle size of the particles of glass frit is less than 1.5 microns.

31. The particle mixture according to claim 1 wherein the weight ratio of glass frit to crystalline oxide material is in the range 99.00:1.00 to 99.90:0.10.

32. The particle mixture according to claim 1 wherein the weight ratio of glass frit to crystalline oxide material is in the range 99.50:0.50 to 99.85:0.15.

* * * * *